April 13, 1954     B. D. DOGGETT     2,674,882
FOUNTAIN PEN BIMETAL THERMOMETER
Filed Oct. 18, 1950
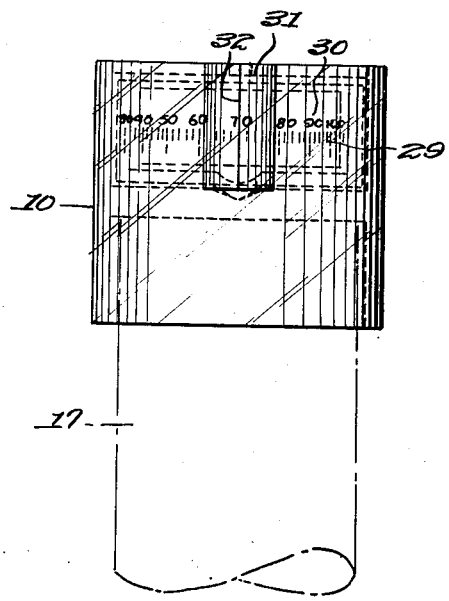
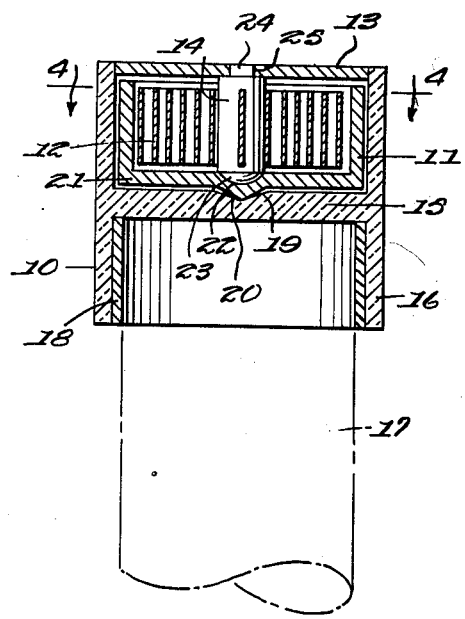
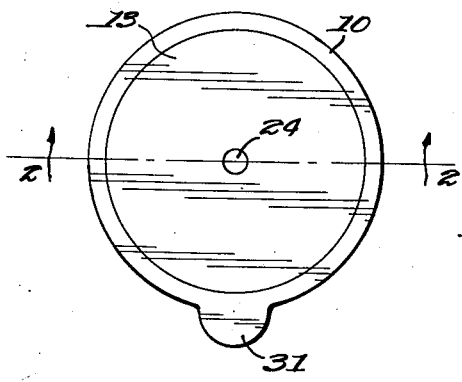
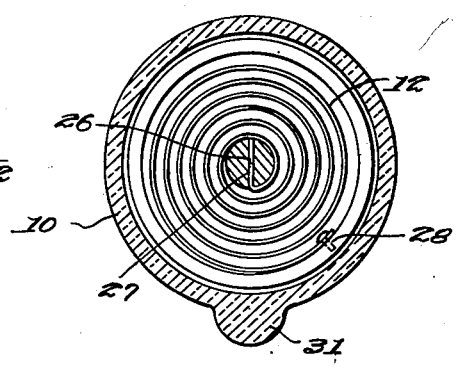
INVENTOR.
Brewster D. Doggett,
BY Victor J. Evans & Co.
ATTORNEYS Patented Apr. 13, 1954

2,674,882

UNITED STATES PATENT OFFICE 2,674,882

FOUNTAIN PEN BIMETAL THERMOMETER

Brewster D. Doggett, Wiscasset, Maine

Application October 18, 1950, Serial No. 190,767

3 Claims. (Cl. 73—343)

This invention relates to thermometers, of the bimetal type, and in particular a comparatively small cup shaped casing formed to be frictionally mounted on the end of a fountain pen or the like with a sleeve rotatably mounted therein and actuated by a bimetal spiral with one end attached to a post at the center and the other to the sleeve wherein the sleeve is rotated by changes in temperature to display numerals representing temperature on the outer surface thereof through a magnifying element forming part of the casing.

The purpose of this invention is to provide a small thermometer that may readily be attached to the casing of a fountain pen so that thermometers may be carried by individuals continuously.

Various types of small thermometers have been provided and these have been combined with instruments and other devices but thermometers of this type are not suitable to be carried continuously. With this thought in mind this invention contemplates a thermometer that may be attached to or incorporated in the cap or casing of a fountain pen, or other similar device so that it may be carried in the pocket, handbag, or the like whereby it is continuously available for use.

The object of this invention is, therefore, to provide means for forming a thermometer so that it may be positioned on the end of a fountain pen or the like.

Another object of the invention is to provide a bimetal thermometer which is so constructed that it may be carried continuously.

Another object of the invention is to provide a housing for a bimetal thermometer whereby the thermometer may be frictionally retained on the end of a fountain pen casing.

A further object of the invention is to provide a comparatively small bimetal thermometer which is of a simple and economical construction.

With these and other objects and advantages in view the invention embodies a cylindrical casing having a transversely disposed partition therein with a cup shaped member rotatably mounted in the casing and actuated by a bimetal spiral element and with a disc providing a closure for the outer end of the casing.

Other features and advantages of the invention will appear from the following description taken in connection with the drawings wherein:

Figure 1 is a side elevational view of the thermometer showing the thermometer on the end of a fountain pen casing with the casing of the fountain pen shown in broken lines.

Figure 2 is a vertical section through the thermometer taken on line 2—2 of Fig. 3.

Figure 3 is a plan view looking downwardly upon the upper end of the casing shown in Fig. 1.

Figure 4 is a sectional plan taken on line 4—4 of Fig. 2.

Referring now to the drawings wherein like reference characters denote corresponding parts the improved bimetal thermometer of this invention includes a cylindrical casing 10, a rotatable cup shaped element 11, a bimetal spiral element 12, a disc 13, and a post 14.

As illustrated in the drawings the cylindrical casing 10 is provided with a transversely disposed partition 15 which provides a skirt 16 at one end of the casing which is formed to fit snugly over the end of a cylindrical or tubular casing 17, such as the shell of a fountain pen, and the shirt may be provided with a liner or bushing 18 which provides means for compensating for fountain pen casings of different diameters.

The bushing 18 may be provided in different thicknesses and may be of such a material that a friction grip is provided between the skirt 16 and the outer surface of the shell or tube 17.

The outer surface of the partition 15 is provided with a centrally positioned recess 19 into which a projection 20 on the base 21 of the cup shaped element 11 is positioned whereby the element 11 is rotatably mounted in the casing. The inner surface of the base 21 is provided with a registering indentation 22 into which an arcuate inner end 23 of the post 14 extends whereby the end 23 of the post coacts with the recess 19 to retain the element 11 in operative position.

The outer end of the post 14 is retained by stud 24 in an opening 25 in the closure disc 13 and the inner end 26 of the spiral bimetal element 12 is positioned in a slot 27 that extends through the post. The outer end of the element 12 is secured by screws 28 to the inner surface of the cylindrical wall of the element 11.

The outer surface of the wall of the element 11 is provided with graduations 29 with corresponding numerals 30 as shown in dotted lines in Fig. 1 and the graduations and numerals are positioned to show through the bulb or thick portion 31 of the casing whereby with the casing formed of plastic or other suitable transparent material the part 31 forms a magnifying element enlarging the numerals representing the temperature so that the temperature may be read through the part 31. The part 31 is provided with a vertically disposed line 32 with which the numerals and divisions register to indicate the temperature.

It will be understood that the parts are enlarged in the drawing as the diameter of the outer casing or shell 10 is about the size of an eraser retaining sleeve on the end of a pencil or the end of the barrel of a fountain pen. When the actual size of the parts is taken into consideration it will be understood that it will be necessary to magnify the numerals in order to read the temperature.

It will be understood that modifications may be made in the design and arrangement of the parts without departing from the spirit of the invention.

What is claimed is:

1. In a bimetal thermometer, the combination which comprises a cylindrical casing having a transverse partition position midway of the length thereof, a cylindrical bushing in one end of the casing, a cup-shaped element rotatably mounted in the casing on the opposite side of the partition, a disc providing a closure in the end of the casing in which the cup-shaped element is positioned, a post carried by the disc and extended into the said cup-shaped element, and a bimetal spiral element positioned in the cup-shaped element with one end attached to the element and the other to the post, said casing having an enlarged magnifying section thereon and said cup-shaped element having temperature representing numerals on the outer surface and positioned to show through the said magnifying section of the casing, said cup-shaped element having an indentation in the inner surface of the base receiving an end of the post, and the said partition of the cylindrical casing having a recess aligned with the post and indentation of the cup-shaped element and positioned to receive a projection on the base of the said cup-shaped element.

2. In a bimetal thermometer for use on a fountain pen, pencil, or the like, the combination which comprises a cylindrical casing having a transversely disposed partition positioned midway of the length thereof dividing the casing into a thermometer compartment and a mounting compartment, a cup-shaped element rotatably mounted in the thermometer compartment of the casing, a closure positioned in the end of the thermometer compartment of the casing, a centrally positioned post carried by the closure and extended into the cup-shaped element, and a bimetal spiral element positioned in the cup-shaped element with one end attached to the element and the other to the post, said cup-shaped element having temperature representing numerals on the outer surface and having an indentation in the inner surface of the base thereof for receiving the end of the post extended from said closure, said transversely disposed partition also having an indentation therein aligned with the axis of the post and indentation of the base of the cup-shaped element, the base of said cup-shaped element having a projection extended into the recess of the partition providing journaling means for said cup-shaped element, and said casing having a transparent section therein positioned to register with the temperature indicating numerals on the surface of the cup-shaped element.

3. In a bimetal thermometer for use on the end of a fountain pen or pencil, the combination which comprises a cylindrical casing of transparent material having a transverse partition positioned midway of the length thereof dividing the casing into a mounting section and a thermometer section, a cup-shaped element having temperature indicating numerals on the peripheral surface journaled in the thermometer section of the casing, a closure having a centrally positioned post thereon mounted in the end of the thermometer section of the casing and positioned with the post extended into said cup-shaped element, and a bimetal spiral element positioned in said cup-shaped element with one end attached to the cup-shaped element and the other to said post and said casing having a magnifying section therein positioned to register with the temperature indicating numerals on the peripheral surface of the cup-shaped element.

References Cited in the file of this patent

UNITED STATES PATENTS

| Number | Name | Date |
| --- | --- | --- |
| 1,403,228 | Brach | Jan. 10, 1922 |
| 1,726,314 | Rose | Aug. 27, 1929 |
| 2,289,908 | Gorton | July 14, 1942 |
| 2,315,779 | Ford | Apr. 6, 1943 |
| 2,597,939 | Lamb | May 27, 1952 |

FOREIGN PATENTS

| Number | Country | Date |
| --- | --- | --- |
| 845,530 | France | May 15, 1939 |